(12) United States Patent
Ota et al.

(10) Patent No.: US 6,471,024 B2
(45) Date of Patent: Oct. 29, 2002

(54) TORQUE LIMITING MECHANISM

(75) Inventors: Masaki Ota; Kazuya Kimura; Satoshi Umemura; Masahiro Kawaguchi; Akifumi Uryu; Taku Adaniya, all of Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 14 days.

(21) Appl. No.: 09/821,379

(22) Filed: Mar. 29, 2001

(65) Prior Publication Data

US 2001/0025761 A1 Oct. 4, 2001

(30) Foreign Application Priority Data

Mar. 29, 2000 (JP) ........................................ 2000-090293

(51) Int. Cl.$^7$ ................................................ F16D 7/02
(52) U.S. Cl. ..................................... 192/56.5; 192/53.6
(58) Field of Search ............................. 192/56.5, 53.6, 192/56.51; 464/37

(56) References Cited

U.S. PATENT DOCUMENTS

| | | | | |
|---|---|---|---|---|
| 974,248 A | * | 11/1910 | Dryden ...................... | 192/56.5 |
| 2,511,678 A | * | 6/1950 | Stephenson .............. | 192/103 C |
| 2,637,987 A | * | 5/1953 | Hill et al. ...................... | 185/43 |
| 2,781,882 A | * | 2/1957 | Burkhardt ............ | 192/105 CD |
| 2,837,902 A | * | 6/1958 | Stevens et al. ............. | 464/101 |
| 5,683,299 A | * | 11/1997 | Kishibuchi et al. ......... | 192/209 |
| 5,706,922 A | * | 1/1998 | Bondioli ..................... | 192/108 |
| 6,234,904 B1 | * | 5/2001 | Kawaguchi et al. ........ | 192/56.5 |

FOREIGN PATENT DOCUMENTS

| | | | | |
|---|---|---|---|---|
| JP | 9-264343 | 10/1997 | ........... | F16D/43/20 |
| JP | 63-19083 | 2/1998 | ........... | F04B/35/00 |
| JP | 10-252772 | 9/1998 | ............. | F16D/7/04 |
| JP | 10-267047 | 10/1998 | ............. | F16D/7/04 |
| JP | 10-267048 | 10/1998 | ............. | F16D/7/04 |
| JP | 11-230188 | 8/1999 | ............. | F16D/7/02 |
| JP | 2000-154836 | 6/2000 | ........... | F16D/43/20 |

* cited by examiner

Primary Examiner—Douglas C. Butler
Assistant Examiner—Benjamin A Pezzlo
(74) Attorney, Agent, or Firm—Morgan & Finnegan, LLP

(57) ABSTRACT

A torque limiting mechanism for transmitting power from an external drive source to the drive shat of a compressor. A pulley, which is coupled to the external drive source, has elastic members. A hub, which is attached to the drive shaft, has engaging portions. A coupler member is located between the pulley and the hub. The coupler member is engaged with the elastic members and with the engaging portions such that power is transmitted from the pulley to the hub. The urging members urge the coupler member such that the coupler member is disengaged from the engaging portions. When power is transmitted from the pulley to the hub, the elastic members maintain the coupler engaged with the elastic members and the engaging portions. When load generated due to power transmission exceeds a predetermined level, the elastic members are deformed such that the coupler member is disengaged from the elastic members. When disengaged from the elastic members, the coupler member is disengaged from the engaging portions.

13 Claims, 7 Drawing Sheets

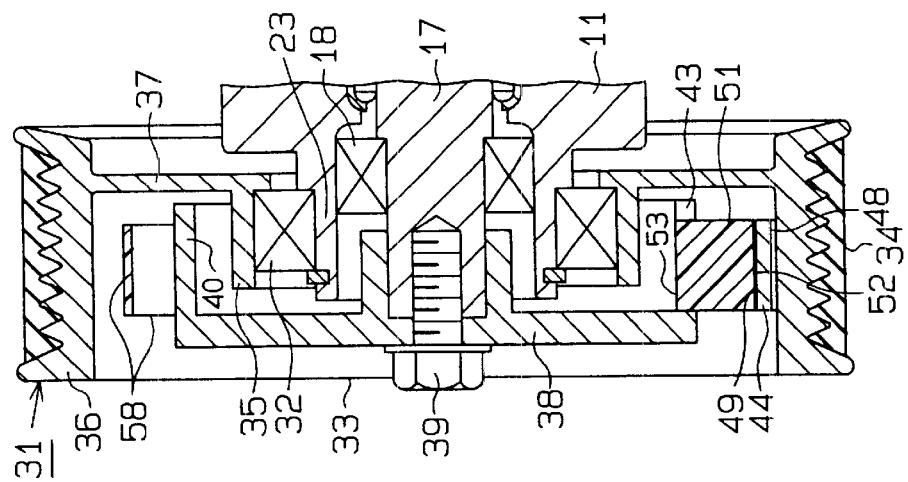
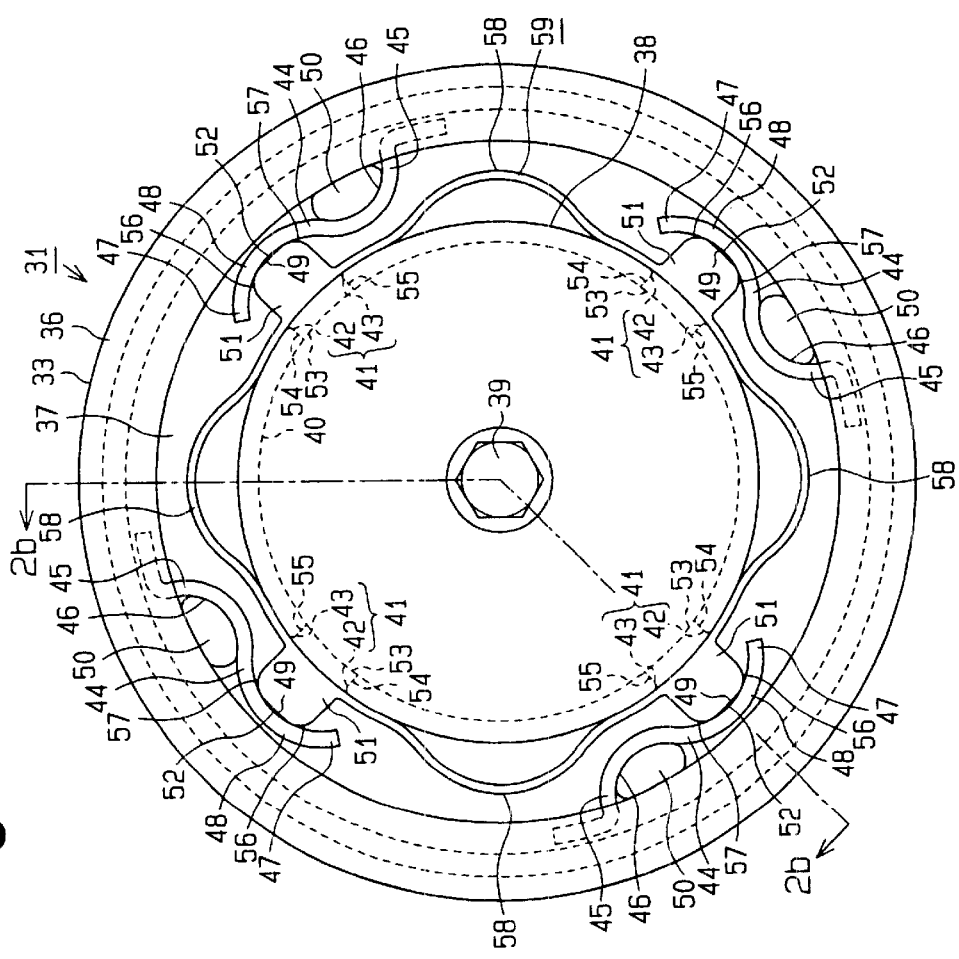

TORQUE LIMITING MECHANISM

BACKGROUND OF THE INVENTION

The present invention relates to a torque limiting mechanism that is located between a first rotor and a second rotor, and more particularly, to a torque limiting mechanism that discontinues power transmission from one of the rotors to the other when an excessive torque is generated in the driven one of the rotors.

A typical torque limiting mechanism is located between a driven device such as a compressor and a drive source such as an engine and a motor. The torque limiting mechanism forcibly disengages the driven device from the power source when a malfunction occurs in the driven device, for example, when the driven device is locked. That is, the mechanism prevents the power source from being affected by an excessive load torque due to the malfunction in the driven device.

Japanese Unexamined Utility Model Publication No. 63-19083 discloses an on-vehicle clutchless type compressor that has such a torque limiting mechanism. The torque limiting mechanism is located between a pulley, which is coupled to an engine, and a drive shaft of a compressor. A power receiver is secured to the drive shaft. A pair of shear pins project from the receiver. The pins are engaged with holes formed in the pulley. When stress applied to the pins exceeds a predetermined limit level due to, for example, a malfunction of the compressor, the pins simultaneously break to disconnect the engine from the compressor.

A torque limiting mechanism that has no breakable couplers like pins also has been proposed. This mechanism has a pair of coupler members that are engaged with each other to couple a drive source with a driven device. When there is an excessive load torque, an elastic member is deformed to disengage the coupler members from each other, which discontinues power transmission (for example, Japanese Unexamined Patent Publications Nos. 10-267047 and 10-252772).

Shear pins in a torque limiting mechanism are designed to break at a predetermined level of torque, or a breaking torque. However, the pins may break at a load that is smaller than the breaking torque. This is because the shear pins get gradually fatigued by stresses due to repetitive fluctuation of normal load torque, which is smaller than the breaking torque, and, as a result, the level of limit stress, at which the shear pine are broken, is gradually lowered. To prevent such undesired breaking due to fatigue, the diameter of each shear pin may be increased. However, if the diameter is increased, it is difficult to cause a new shear pin, which is not fatigued, to break at a desired breaking torque.

A torque limiting mechanism that has breakable members requires no means to maintain a discontinuation of power transmission. However, a torque limiting mechanism that has two coupler members requires means for maintaining a discontinuation of power transmission, which complicates the structure.

SUMMARY OF THE INVENTION

Accordingly, it is an objective of the present invention to provide a torque limiting mechanism that reduces variations of a level of load torque at which power transmission is discontinued and maintains discontinuation of power transmission with a simple structure.

To achieve the foregoing and other objectives and in accordance with the purpose of the present invention, a torque limiting mechanism is provided. The mechanism includes a first rotor that has an elastic member, a second rotor that has an engaging portion, a coupler member that is located between the rotors and an urging member that urges the coupler member such that the coupler member is disengaged from the engaging portion. The coupler member is engaged with the elastic member and with the engaging portion such that power is transmitted between the rotors. When power is transmitted between the rotors, the elastic member maintains the coupler member engaged with the elastic member and with the engaging portion. When load generated either in the first rotor or in the second rotor due to power transmission exceeds a predetermined level, the elastic member is elastically deformed such that the coupler member is disengaged from the elastic member. When disengaged from the elastic member, the coupler member is disengaged from the engaging portion by the urging member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2(a) is a front view illustrating the torque limiting mechanism of FIG. 1;

FIG. 2(b) is a cross-sectional view taken along line 2b—2b of FIG. 2(a);

DETAILED DESCRIPTION OF THE PREFERRED EMBODIMENTS

A torque limiting mechanism 31 according to a first embodiment of the present invention will now be described with reference to FIGS. 1 to 7. The mechanism 31 transmits power from an engine Eg to a compressor C of a vehicle air conditioner.

Figure 1:
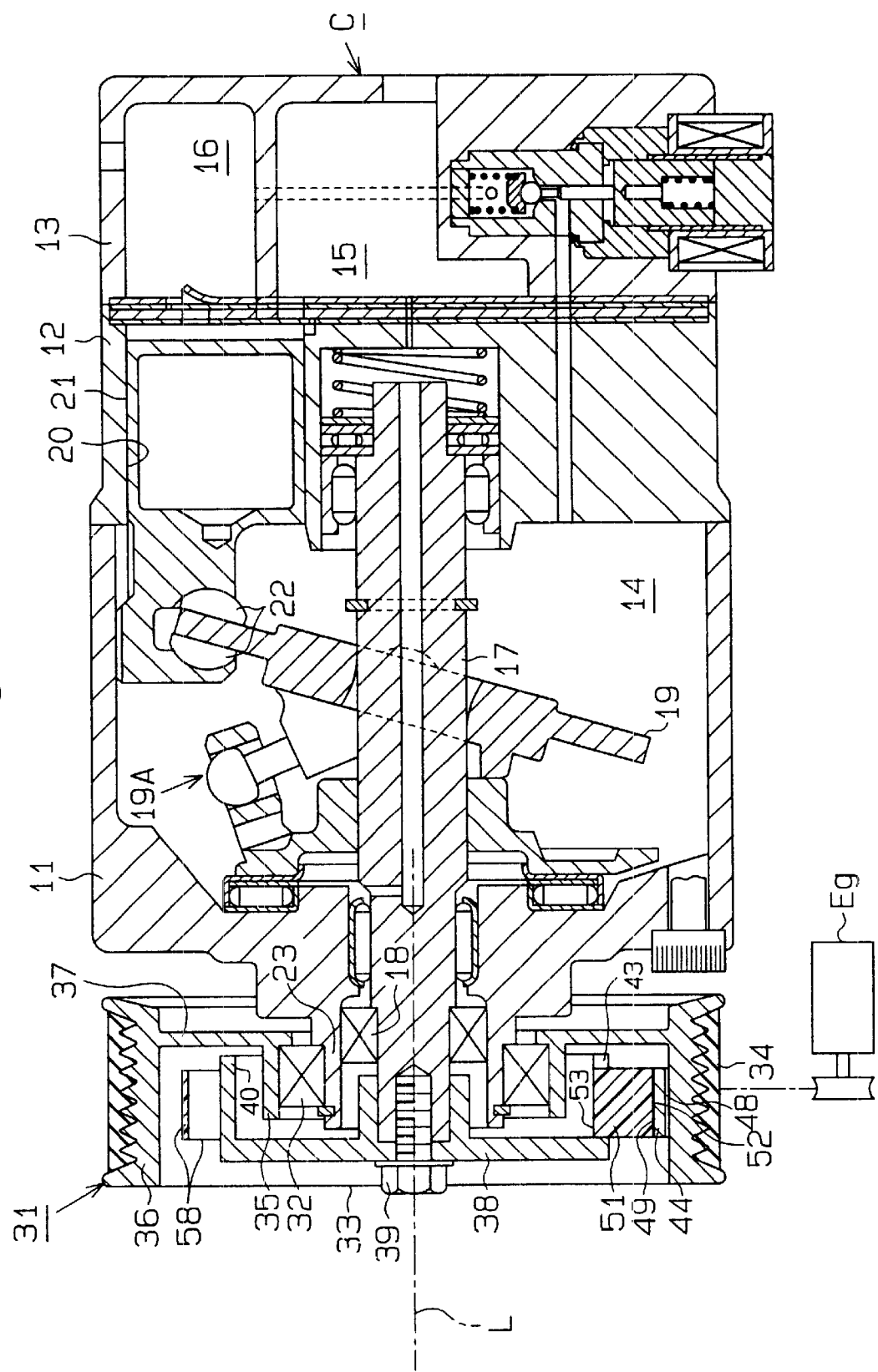
FIG. 1 is a cross-sectional view illustrating a compressor that has a torque limiting mechanism according to a first embodiment of the present invention.

In FIG. 1, the left end of the compressor C is defined as the front end, and the right end of the compressor C is defined as the rear end.

As shown in FIG. 1, the compressor C includes a cylinder block 12, a front housing member 11, which is secured to the front end face of the cylinder block 12, and a rear housing member 13, which is secured to the rear end face of the cylinder block 12. The front housing member 11, the cylinder block 12 and the rear housing member 13 form the housing of the compressor C.

A crank chamber 14 is defined between the front housing member 11 and the cylinder block 12. A suction chamber 15 and a discharge chamber 16 are defined between the cylinder block 12 and the rear housing member 13.

A rotary shaft 17 is rotatably supported in the front housing member 11 and the cylinder block 12. The front end of the rotary shaft 17 projects from the front end of the front housing member 11. A shaft sealing assembly 18, which is a lip seal, is located between the rotary shaft 17 and the front housing member 11 to seal the crank chamber 14. The rotary shaft 17 is coupled to the engine Eg through the torque limiting mechanism 31 without a clutch such as an electromagnetic clutch. The rotary shaft 17 is therefore rotated when the engine Eg is running.

A swash plate 19 is located in the crank chamber 14. Specifically, the swash plate 19 is coupled to the rotary shaft 17 by a hinge mechanism 19A such that the swash plate 19 rotates integrally with the rotary shaft 17. Several cylinder bores 20 (only one is shown in FIG. 1) are formed in the cylinder block 12. A single-headed piston 21 is reciprocally housed in each cylinder bore 20. One end of each piston 21 is coupled to the periphery of the swash plate 19 by a pair of shoes 22. When the rotary shaft 17 rotates, the swash plate 19 rotates, which reciprocates each piston 21 in the associated cylinder bore 20. Reciprocation of each piston 21 draws refrigerant gas from the suction chamber 15 to the associated cylinder bore 20. The refrigerant gas is then compressed in the cylinder bore and is then discharged to the discharge chamber 16.

The torque limiting mechanism 31 will now be described.

As shown in FIGS. 1 and 2(b), a support cylinder 23 is formed in the front portion of the front housing member 11. An angular bearing 32 is located about the support cylinder 23. A first rotor, which is a pulley 33 in this embodiment, is rotatably supported on the support cylinder 23 through the angular bearing 32. The pulley 33 is coupled to the engine Eg by a V-belt 34.

The pulley 33 includes a boss 35, which is attached to the outer ring of the angular bearing 32, an outer ring 36 and a disk portion 37. The belt 34 is engaged with the outer ring 36. The disk portion 37 couples the boss 35 to the outer ring 36.

A second rotor, which is a hub 38 in this embodiment, is fixed to the front end of the rotary shaft 17 by a bolt 39. An inner ring 40 is formed in the outer periphery of the hub 38. The inner ring 40 is coaxial with the outer ring 36. The diameter of the inner ring 40 is smaller than that of the outer ring 36.

As shown in FIG. 2(a), engaging portions, which are grooves 41, are formed in the inner ring 40. Each adjacent pair of the grooves 41 are separated by ninety degrees about the axis L of the rotary shaft 17. Each groove 41 has parallel and flat inner surfaces 42 and 43. An imaginary plane that is midway between and parallel to the inner surfaces 42 and 43 of each groove 41 includes the center of the hub 38. The inner surface of the outer ring 36 and the outer surface of the inner ring 40 are circular and have a common axis, which is the axis L of the rotary shaft 17.

Elastic members, which are wavy power transmission springs 44 in this embodiment, are located between the outer ring 36 and the inner ring 40. Each adjacent pair of the springs 44 are separated by ninety degrees about the axis L of the rotary shaft 17. The pulley 33 rotates clockwise as viewed in FIG. 2(a). The proximal end of each spring 44 is located at the leading side and is secured to the outer ring 36. Each spring 44 is fixed to the outer ring 36 in a cantilever manner.

Each transmission spring 44 includes an inward portion 46 and an outward portion 48. The inward and outward portions 46, 48 are arcuate. The inward portion 46 bulges toward the inner ring 40 and the outward portion 48 bulges toward the outer ring 36. A rubber damper 50 is located between the inward portion 46 of each transmission spring 44 and the inner surface of the outer ring 36. The outward portion 48 of each spring 44 has a concave 49, which faces the hub 38.

When a radially outward force is applied to the distal end 47 of each transmission spring 44, the spring 44 is elastically deformed. At this time, the proximal end 45 functions as the fulcrum. The deformation causes the outward portion 48 to contact the inner surface of the outer ring 36. If the force is increased, part of the spring 44 that is between the distal end 47 and the point contacting the outer ring 36 is elastically deformed. The spring 44 would be similarly deformed by applying outward force to any point between the distal end 47 and the contact point.

The curvature between the distal end 47 and the contact point is greater than the curvature between the contact point and the inward portion 46.

Each rubber damper 50 contacts the corresponding transmission spring 44 and the outer ring 36.

A coupler member, which is a resin coupler ring 59 in this embodiment, is located between the transmission springs 44 and the hub 38. The coupler ring 59 has four coupler blocks 51 and four leaf springs 58, which are alternately arranged. Each coupler block 51 is substantially cube-shaped and has a first side 54 and a second side 55. The outer surface 52 of each coupler block 51 is located in the corresponding concave 49. The inner surface 53 of each coupler block 51 is located in the corresponding groove 41. Each leaf spring 58 couples the first side 54 of one of the blocks 51 to the second side 55 of the adjacent block 51.

The curvature of the outer surface 52 of each coupler block 51 is the same as that of the inner surface of the outer ring 36. The outer surface 52 is bulged toward the inner surface of the outer ring 36. The curvature of each outer surface 52 is smaller than the curvature of any part of the corresponding concave 49. The curvature of the inner surface 53 of each coupler block 51 is equal to the curvature of the inner surface of the inner ring 40. The inner surface 53 of each coupler block 51 is concaved.

When each coupler block 51 is located in the corresponding groove 41, or when each coupler block 51 is in an engaged state, the ends of the corresponding coupler springs 58 contact the inner ring 40 and prevent the coupler block 51 from moving further radially inward. In this state, the inner surface 53 of each coupler block 51 does not protrude inward from the inner surface of the inner ring 40. The distance between the outer surface 52 and the inner surface 53 of each coupler block 51, or the maximum radial dimension of each coupler block 51, is smaller than the distance between the inner surface of the outer ring 36 and the outer surface of the inner ring 40.

The distance between the sides 54, 55 of each coupler block 51, or the circumferential dimension of each coupler block 51, is substantially the same as the distance between the inner surfaces 42, 43 of the corresponding groove 41. Also, when each block 51 is engaged with the groove 41, the sides 54, 55 are parallel to the inner surfaces 42, 43 of the corresponding groove 41. Each coupler block 51 can move in the radial direction of the hub 38 so that the coupler block 51 can be detached from the corresponding groove 41.

Corners 56, 57 are formed at the ends of the outer surface of each coupler block 51. The curvature of the corners 56, 57 is greater than the curvature of any part of the concave 49. When there is no power transmission load between the pulley 33 and the hub 38, the corners 56, 57 of each coupler block 51 contact the concave 49 of the corresponding transmission spring 44. When each coupler block 51 is in the corresponding concave 49, the outer surface 52 does not contact the spring 44, but the corners 56, 57 contact the spring 44, which creates a space between the outer surface 52 and the spring 44.

When the pulley 33 and the hub 38 rotate relative to each other within a predetermine angle range due to load of the hub 38, each coupler block 51 slides on the corresponding concave 49 while being engaged with the concave 49. The surface of the concave 49, on which the block 51 slides when the pulley 33 and the hub 38 relatively rotate in the predetermined angle range, will be referred to a sliding surface.

When a load is generated between the pulley 33 and the hub 38, each coupler block 51 moves relative to the pulley 33, which causes one of the corners 56, 57 to contact the sliding surface of the concave 49 and presses the corresponding transmission spring 44. The part of the coupler block 51 that contacts the concave 49 is inclined relative to the circumference of the pulley 33. Therefore, the coupler block 51 elastically deforms the corresponding transmission spring 44 radially outward.

As described above, each coupler block 51 is engaged with the corresponding groove 41 and with the corresponding transmission spring 44 of the pulley 33, which permits power transmission between the pulley 33 and the hub 38. In this state, the pulley 33 and the hub 38 can rotate relative to each other in the predetermined angle range.

Figure 3:
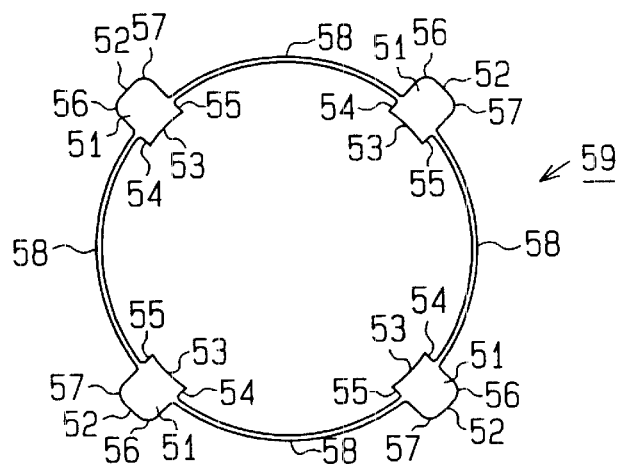
FIG. 3 is a diagrammatic view illustrating a power coupler member in the original shape.

FIG. 3 illustrates the coupler ring 59 in its original form. In this state, the coupler springs 58 are substantially arcuate. To engage the ring 59 with the transmission springs 44 and the hub 38, each coupler block 51 is pressed radially inward toward the center of the hub 38 against the force of the coupler springs 58 and is fitted into the corresponding groove 41 as shown in FIG. 2(*a*). At this time, the coupler springs 58 are elastically deformed to bulge radially outward relative to the blocks 51. After the coupler ring 59 is installed, the force of the springs 58 toward the original form of the ring 59 is weaker than the force of the transmission springs 44 that urge the coupler blocks 51 radially inward. Thus, the proximal ends of the coupler springs 58, or parts that are coupled to the corresponding coupler blocks 51, are pressed against the inner ring 40 by a force representing the difference between the force of the coupler springs 58 and the force of the transmission springs 44. This maintains the coupler blocks 51 engaged with the hub 38.

Figure 7:
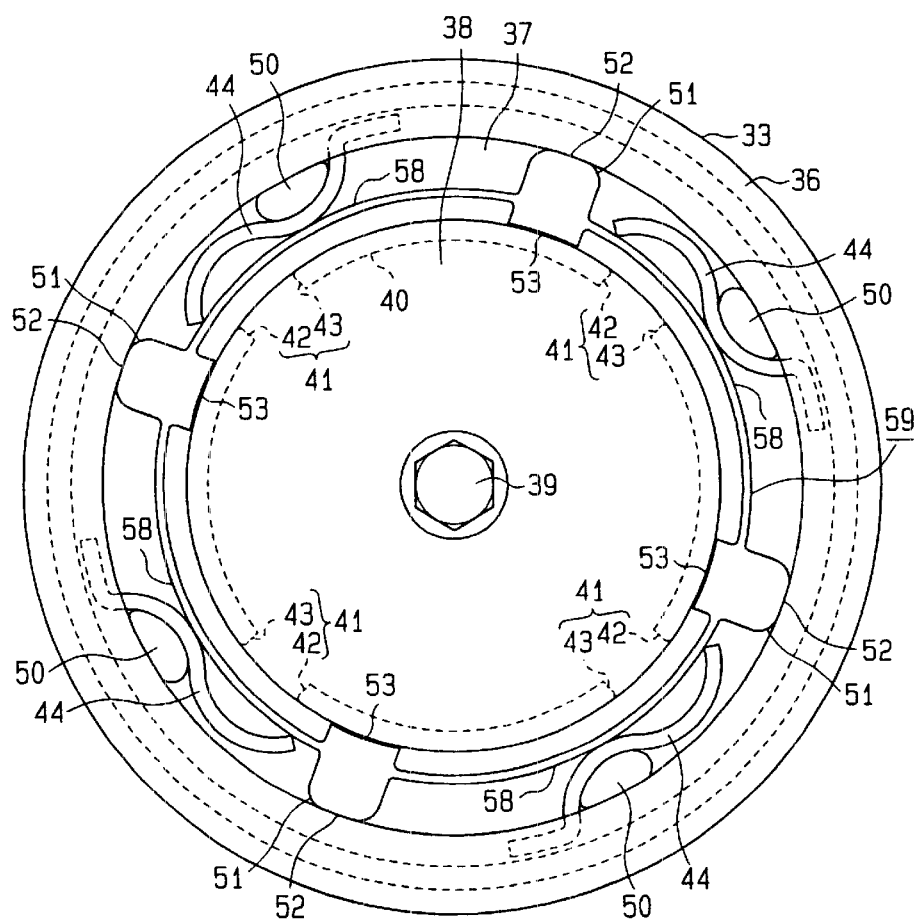
FIG. 7 is a front view illustrating the torque limiting mechanism of FIG. 1, when the coupler blocks are disengaged from the hub.

FIG. 7 illustrates a state where the coupler ring 59 is disengaged from transmission springs 44 and the hub 38. In this state, the outer surfaces 52 of the coupler blocks 51 are pressed against the inner surface of the outer ring 36 by the force of the coupler springs 58. The force of the coupler springs 58 is great enough to press the coupler block 51 against the outer ring 36. A space is created between the inner surface 53 of each coupler block 51 and the inner ring 40 of the hub 38, which separates the coupler blocks 51 from the hub 38. In this manner, the coupler springs 58 maintain the coupler blocks 51 disengaged from the pulley 33 and the hub 38.

The operation of the torque limiting mechanism 31 will now be described.

The power of the engine Eg is transmitted to the pulley 33 by the belt 34. The power is then transmitted to the coupler blocks 51 through the transmission springs 44, which are fixed to the outer ring 36, and is then transmitted to the rotary shaft 17 through the hub 38. When a load is generated between the pulley 33, which is connected to the drive source, and the hub 38, which is connected to the driven device, the transmission springs 44 move relative to the coupler blocks 51, which rotates the pulley 33 relative to the hub 38.

Figure 4:
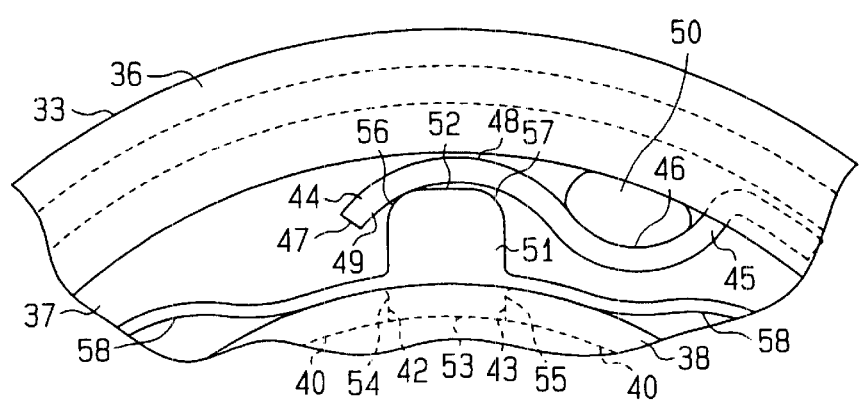
FIG. 4 is a partial enlarged cross-sectional view illustrating the mechanism of FIG. 1, when a coupler block presses a power transmission spring.

Since the pulley 33 rotates clockwise as viewed in FIG. 4, the hub 38, together with the coupler block 51, rotates counterclockwise relative to the pulley 33. The corner 56 of each coupler block 51 slides on the sliding surface of the corresponding concave 49, which elastically deforms the corresponding transmission spring 44 in the radial direction of the pulley 33. At this time, the second corner 57 separates from the sliding surface and the corner 56 contacts the sliding surface. When the load is in the normal range, power transmission is performed in this state.

As the relative rotation between the pulley 33 and the hub 38 is increased, the contact point between the corner 56 of each coupler block 51 and the sliding surface of the corresponding concave 49 is moved toward the distal end 47 of the transmission spring 44. The inclination of the sliding surface relative to the pulley 33 increases toward the distal end 47. Therefore, as the contact point moves toward the distal end 47, the amount of the elastic deformation, or the displacement of the distal end 47 relative to the proximal end 45, is increased.

If the relative rotation between the pulley 33 and the hub 38 increases due to a malfunction of the compressor C, the distal end 47 of each transmission spring 44 is further moved radially outward relative to the proximal end 45. As a result, the outward portion 48 of the transmission spring 44 contacts the inner surface of the outer ring 36.

The elastic deformation of each spring 44 until the outward portion 48 contacts the inner surface of the outer ring 36 will hereafter be referred to as a first deformation. If the load is increased further from the state of FIG. 5, the spring 44 is deformed relative to a fulcrum that is the contact point between the outward portion 48 and the outer ring 36. This deformation will be referred to as a second deformation. The second deformation is caused by an effort that is applied to the contact point between the coupler block 51 and the sliding surface of the concave 49. The distance between the contact point of the coupler block 51 and the fulcrum (the contact point of the outward portion 48 and the outer ring 36) is significantly shorter than the distance between the fulcrum and the effort point of the first deformation. Therefore, when the second deformation sets in, the force of each transmission spring 44, which acts on the corresponding coupler block 51, is abruptly increased, which hinders the relative rotation between the pulley 33 and the hub 38.

Figure 6:
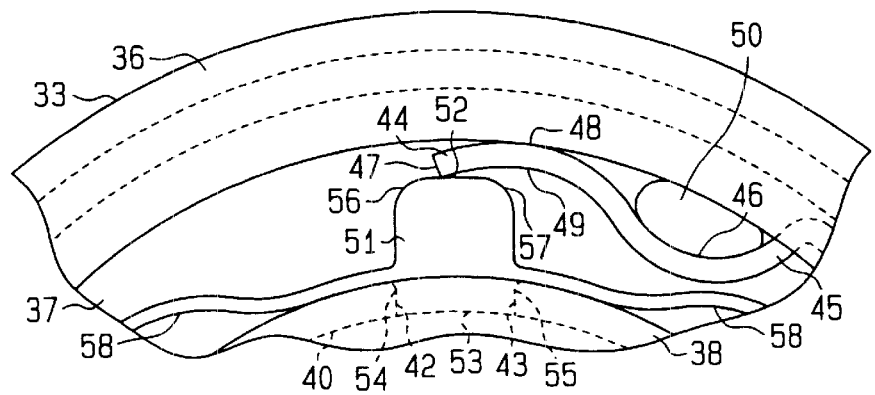
FIG. 6 is a partial enlarged cross-sectional view illustrating the mechanism of FIG. 1, when the coupler block is about to be disengaged from the power transmission spring.

If the relative rotation between the pulley 33 and the hub 38 continues despite the force based on the first and second deformations, the corner 56 of each coupler block 51 separates from the sliding surface of the corresponding the concave 49 as shown in FIG. 6 and the distal end 47 contacts the outer surface 52 of the coupler block 51. If the relative rotation further increases and, as a result, the load between the pulley 33 and the hub 38 exceeds a predetermined level, the coupler block 51 is disengaged from the transmission spring 44.

When disengaged from the transmission springs 44, the coupler blocks 51 are moved radially outward by the force of the coupler springs 58 as shown in FIG. 7. As a result, each coupler block 51 is disengaged from the corresponding groove 41, which disengages the coupler blocks 51 from the hub 38. The force of the coupler springs 58 causes the coupler blocks 51 to contact the inner surface of the outer ring 36, which causes the ring 59 to rotate integrally with the pulley 33. Since there is a space between each coupler block 51 and the hub 38, rotation of the pulley 33 is not transmitted to the hub 38. Thus, the power transmission from the pulley 33 to the hub 38 is discontinued.

The fluctuation of the compression reaction force of the compressor C and the fluctuation of the drive shaft of the engine Eg constantly create load fluctuations (torque fluctuations) between the pulley 33 and the hub 38. Therefore, the hub 38 alternately rotates clockwise and counterclockwise relative to the pulley 33.

When there is only the first deformation in each transmission spring 44 as shown in FIG. 4, the effort point reciprocates repeatedly on the sliding surface of the concave 49, that is the effort point reciprocates in the circumferential direction of the pulley 33. Therefore, the distance between the effort point and the fulcrum (the proximal end 45) constantly changes. The modulus of elasticity of the transmission spring 44 constantly changes accordingly, which suppresses the resonance of the pulley 33 and the hub 38.

Figure 5:
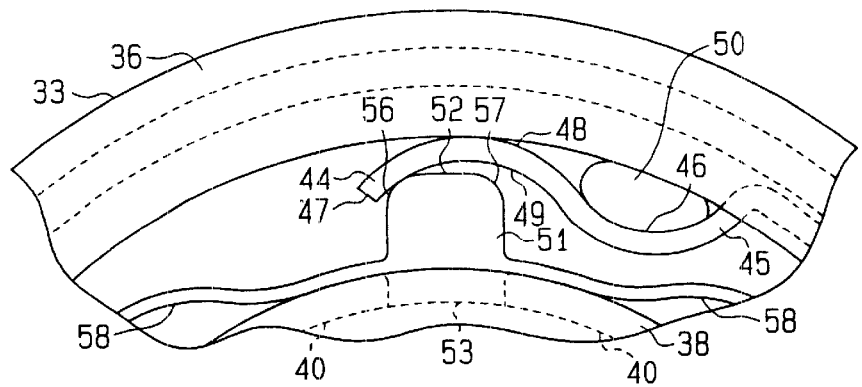
FIG. 5 is a partial enlarged cross-sectional view illustrating the mechanism of FIG. 1, when the power transmission spring contacts the pulley.

When the first and second deformations are being created as shown in FIG. 5, the distance between the fulcrum (the contact point between the outward portion 48 and the outer ring 36) and the effort point constantly changes. Thus, the modulus of elasticity of the spring 44 constantly changes, which suppresses the resonance. That is, when each coupler block 51 is engaged with the corresponding transmission spring 44 and power is transmitted between the pulley 33 and the hub 38, the pulley 33 and the hub 38 are prevented from resonating.

Each coupler block 51 reciprocates repeatedly along the corresponding concave 49. The friction between the coupler block 51 and the concave 49 reduces relative vibration of the pulley 33 and the hub 38, which reduces the fluctuation of the power transmission load.

Each rubber damper 50 absorbs the vibration of the corresponding transmission spring 44 about the proximal end 45, which decreases the relative vibration between the pulley 33 and the hub 38. Accordingly, the fluctuation of the transmission power load is reduced.

The above embodiment has the following advantages.

(1) When the load between the pulley 33 and the hub 38 exceeds the predetermined level, the power transmission between the pulley 33 and the hub 38 is discontinued. Thus, the engine Eg is prevented from receiving excessive load.

(2) The coupler blocks 51 are disengaged from the pulley 33 and from the hub 38, which positively discontinues the power transmission.

(3) When disengaged from the corresponding transmission spring 44, each coupler block 51 is disengaged from the hub 38 by the force of the corresponding coupler springs 58, which positively discontinues the power transmission.

(4) The coupler springs 58 causes the coupler blocks 51 to rotate integrally with the pulley 33 and prevents the blocks 51 from reengaging with the transmission springs 44 and the hub 38. In other words, the coupler springs 58 positively maintain discontinuance of power transmission. When the blocks 51 are disengaged from the transmission springs 44 and the hub 38, the coupler springs 58 also prevent the blocks 51 from moving violently between the outer ring 36 and the hub 38, which reduces noise and prevents the parts from being damaged. When the blocks 51 are disengaged, the outer surface 52 of each block 51 contacts the inner surface of the outer ring 36 at a relatively large area, which permits the blocks 51 to stably rotate integrally with the pulley 33.

(5) The coupler springs 58 not only forcibly disengage the coupler blocks 51 from the hub 38 but also permit the coupler blocks 51 to rotate integrally with the pulley 33. In other words, a single member has two functions, which reduces the number of parts and simplifies the structure.

(6) The sliding surface of each transmission spring 44, which contacts the corresponding coupler block 51, is formed on the transmission spring 44. That is, each transmission spring 44 is an integrated part that has the sliding surface and parts that urge the sliding surface, which reduces the number of the parts and simplifies the structure.

(7) When each coupler block 51 is moved radially outward and is disengaged from the corresponding groove 41, the blocks 51 are disengaged from the hub 38. Unlike a case where the blocks 51 are moved axially to be disengaged from the hub 38, the illustrated embodiment need not have additional parts for moving the blocks 51 axially and a space for accommodating the additional parts, which reduces the sizes of the pulley 33 and the hub 38. In the engine compartment in which the compressor C is placed, a dimension of a space for the compressor C is limited in the axial direction. Thus, the illustrated embodiment is particularly effective. Also, when being disengaged from the hub 38, the blocks 51 apply no reaction force to the rotary shaft 17. Therefore, no force in the axial direction is produced.

(8) The friction between each block 51 and the corresponding transmission spring 44 reduces the range of fluctuation of the load applied to the pulley 33 by the hub 38. This reduces disturbing vibration and noise.

(9) The rubber dampers 50 also prevent vibrations and noise.

(10) The modulus of elasticity of each transmission spring 44 changes as the contact point between the spring 44 and the corresponding block 51 moves. Therefore, the resonance of the pulley 33 and the hub 38 is suppressed.

(11) The distal end 47 of each transmission spring 44 extends radially inward. Therefore, a force that is greater than a predetermined level is required to disengage the blocks 51 from the transmission springs 44 against the radially inward force of the transmission springs 44. This prevents the power transmission from being discontinued when the load is relatively small.

The sliding surface of each concave 49 is substantially arcuate. Therefore, as the contact point approaches the distal end 47, the rate of increase of the load between the pulley 33 and the hub 38 (the increase of load per unit angle of the relative rotation) is gradually increased. That is, since the sliding surface of the concave 49 is arcuate, the block 51 is continuously moved to a point at which the block 51 is disengaged from the transmission spring 44. Therefore, shock produced until power transmission is discontinued is reduced.

(12) The curvature of the sliding surface of the concave 49 is greater in the area close to the distal end 47 than in the area close to the proximal end 45. Therefore, when the load is relatively small, the blocks 51 are not disengaged from the transmission springs 44. In other words, power transmission is not discontinued when the load is relatively small.

(13) While each block 51 is sliding on the sliding surface of the corresponding concave 49, the block 51 is not disengaged from the transmission spring 44. Therefore, the blocks 51 are disengaged from the transmission springs 44 only when the load exceeds a predetermined level.

(14) When the blocks 51 are engaged with the concaves 49, the outer surface 52 of each block 51 does not contact the corresponding transmission spring 44 and one of the corners 56, 57 contacts the transmission spring 44. This does not wear the outer surface 52. Therefore, the amount of elastic deformation of each transmission spring 44 at which the corresponding block 51 is disengaged from the spring 44 is not changed. Therefore, the level of the load at which the power transmission between the pulley 33 and the hub 38 is discontinued is stable. Also, the life of the mechanism 31 is extended and maintenance is facilitated.

(15) When the outward portion 48 of each spring 44 is pressed against the inner surface of the outer ring 36 by the corresponding block 51, the fulcrum of the deformation of the corresponding transmission spring 44 is changed from the proximal end 45 to the contact point between the outward portion 48 and the outer ring 36. When the fulcrum is changed, the modulus of elasticity is increased. This prevents the power transmission between the pulley 33 and the hub 38 from being discontinued by a relatively small load.

(17) The coupler blocks 51 are integrated with the coupler springs 58 to form the ring 59, which facilitates the assembly. Also, since the transmission ring 59 is integral even if the coupler blocks 51 are disengaged from the pulley 33 and from the hub 38, the mechanism 31 is easy to handle.

(18) The coupler springs 58 and the coupler blocks 51 are coupled to form the closed ring 59. Compared to a case where a member that has an open part, the ring 59 applies stronger force to the coupler blocks 51.

(19) The blocks 51 are urged radially outward away from the center of the hub 38 by the coupler springs 58. Also, when being disengaged from the hub 38, the blocks 51 are urged outward by the centrifugal force of the rotating hub 38, which positively separates the bocks 51 from the hub 38. As a result, the pulley 33 is positively disengaged from the hub 38.

(20) The ring 59 is an integrated member, which is made of a synthetic resin. Thus, the manufacture is easy and the cost is reduced. Also, the weight of the ring 59 can be reduced. The reduced weight of the ring 59 decreases the influence of centrifugal force acting on the transmission springs 44. If the transmission springs 44 are harder than the blocks 51, the blocks 51 will be worn. Since the ring 59 is light, the ring 59 is easily replaced by a new one when the blocks 51 are worn.

(21) When the coupler blocks 51 are engaged with the hub 38, the inner surface 53 of each block 51 does not protrude inward from the inner surface of the hub 38. Therefore, the size of the hub 38 can be reduced and the size of the pulley 33 can be reduced, accordingly.

(22) The magnitude of the load at which the power transmission between the pulley 33 and the hub 38 is discontinued can be easily adjusted by changing the shapes of the transmission springs 44 and the shapes of the transmission ring 59. This reduces the cost for developing the product. For example, the radial dimension of the each concave 49 between the distal end 47 and the fulcrum of the second deformation, the axial dimension of each transmission spring 44 and the thickness of the spring 44 may be changed. Also, the radial dimension of each block 51, the axial dimension of each coupler spring 58 and the thickness of each coupler spring 58 may be changed.

(23) The range of fluctuation of the load applied to the pulley 33 from the hub 38 can be decreased by changing the friction between each block 51 and the corresponding transmission spring 44. The friction may be changed by, for example, by coating the concaves 49 with fluororesin or with a low friction material, by applying lubricant on the concaves 49, by adjusting the contacting area between each transmission spring 44 and the corresponding block 51 or by adjusting the force of each transmission spring 44 that is applied to the corresponding block 51. Alternatively, a roller may be attached to each block 51 and the block 51 may contact the corresponding transmission spring 44 through the roller, which permits the friction to be adjusted.

It should be apparent to those skilled in the art that the present invention may be embodied in many other specific forms without departing from the spirit or scope of the invention. Particularly, it should be understood that the invention may be embodied in the following forms.

Figure 8:
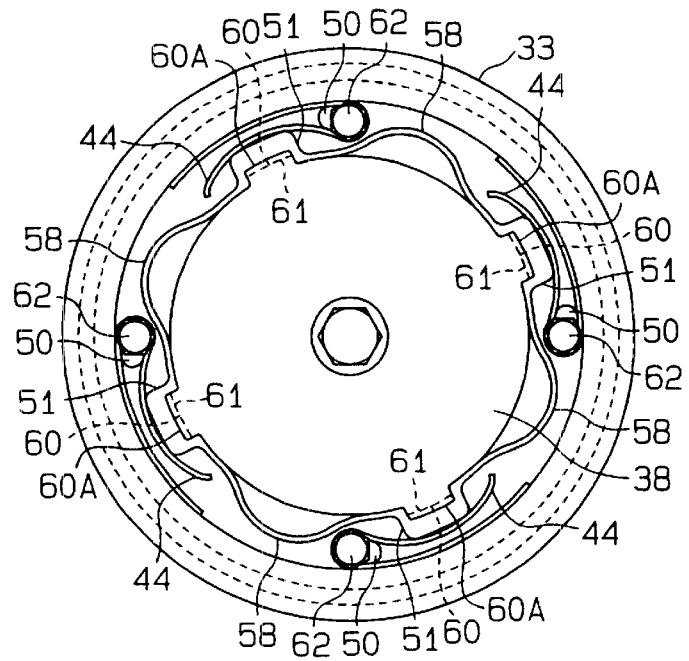
FIG. 8 is a front view illustrating a torque limiting mechanism according to a second embodiment of the present invention.
Figure 9:
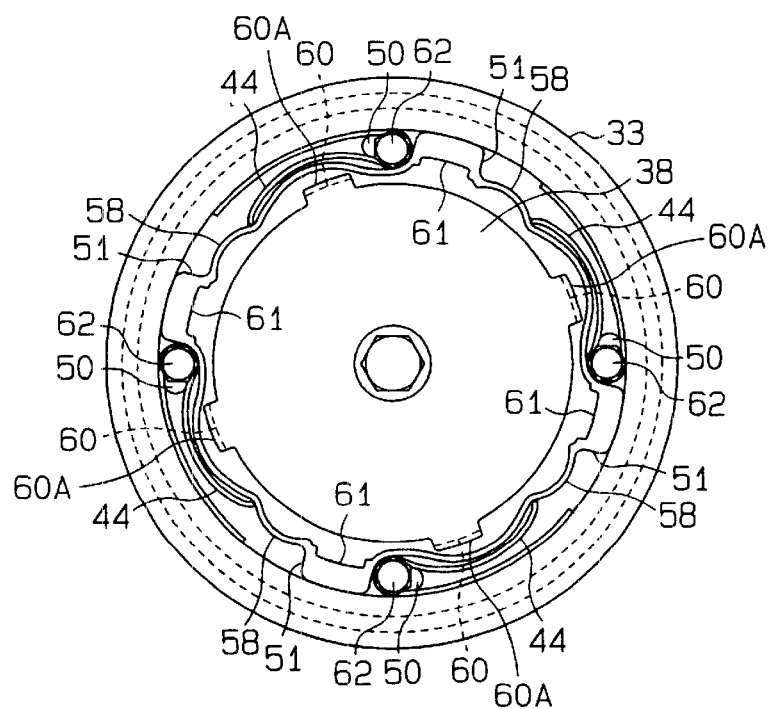
FIG. 9 is front view illustrating the mechanism of FIG. 8, when the mechanism discontinues power transmission.

In a second embodiment shown in FIGS. 8 and 9, engaging projections 60 are formed on the hub 38. Each engaging projection 60 is engaged with a recess 61 that is formed in the corresponding block 51. Unlike the embodiment of FIGS. 1 to 7, the hub 38 need not have grooves 41, which are shown in FIG. 2(*a*). The structure of the second embodiment improves the strength of the hub 38, which receive relatively great forces.

Each engaging projection 60 has a stopper 60A, which extends in the axial direction of the hub 38. The stoppers 60A prevent the blocks 51 from being greatly moved in the axial direction.

When the blocks 51 are disengaged from the hub 38 as shown in FIG. 9, each block 51 contacts the proximal end (the part in the vicinity of a corresponding screw 62) of the corresponding transmission spring 44. Thus, the block 51 is securely fixed to the pulley 33. In the state of FIG. 9, the distal end of each transmission spring 44 presses the corresponding coupler springs 58 radially inward, which increases the force by which the blocks 51 are pressed against the pulley 33.

Figure 10:
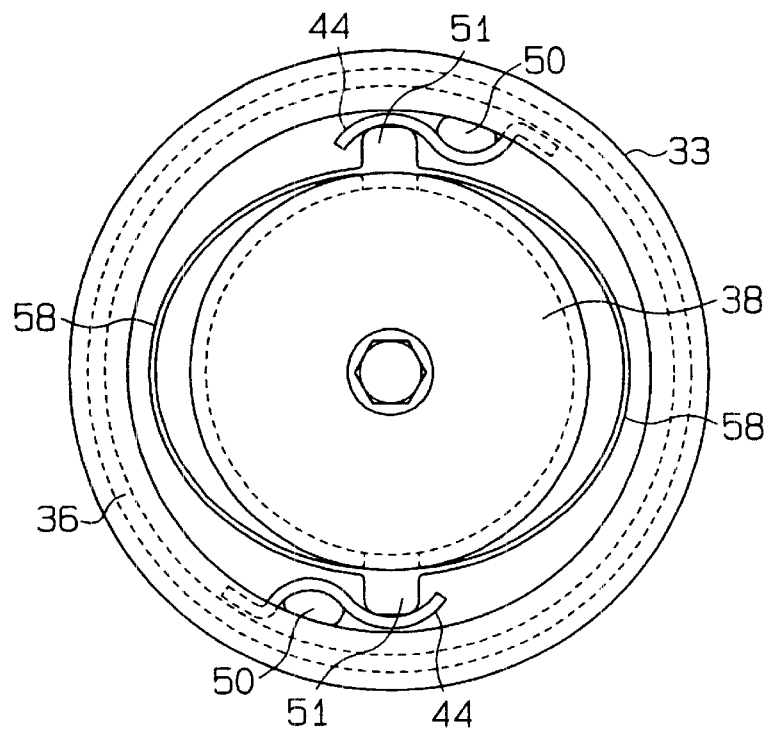
FIG. 10 is a front view illustrating a torque limiting mechanism according to a third embodiment of the present invention.
Figure 11:
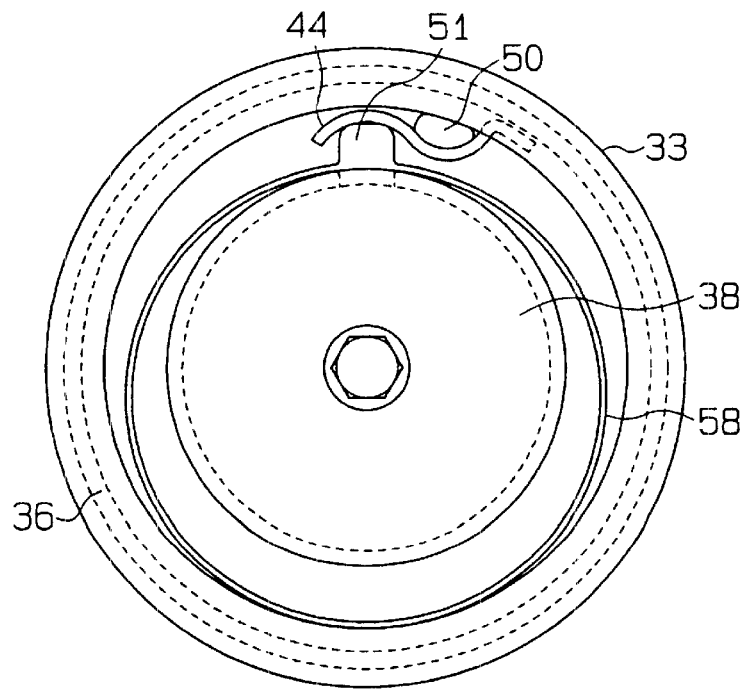
FIG. 11 is a front view illustrating a torque limiting mechanism according to a fourth embodiment of the present invention.

The number of the blocks 51 is not limited to four. For example, as in a third embodiment shown in FIG. 10, the number of the blocks 51 may be two. Alternatively, as in a fourth embodiment shown in FIG. 11, only one block 51 may be formed. In the fourth embodiment, the coupler spring 58 contacts the outer ring 36 to urge the block 51. The level of transmission power load at which power transmission between the pulley 33 and the hub 38 is discontinued can be adjusted by changing the number of the blocks 51. If the number of the blocks 51 is reduced, the number of the transmission spring 44 and the number of the rubber damper 50 are reduced, accordingly, which simplifies the assembly.

Figure 12:
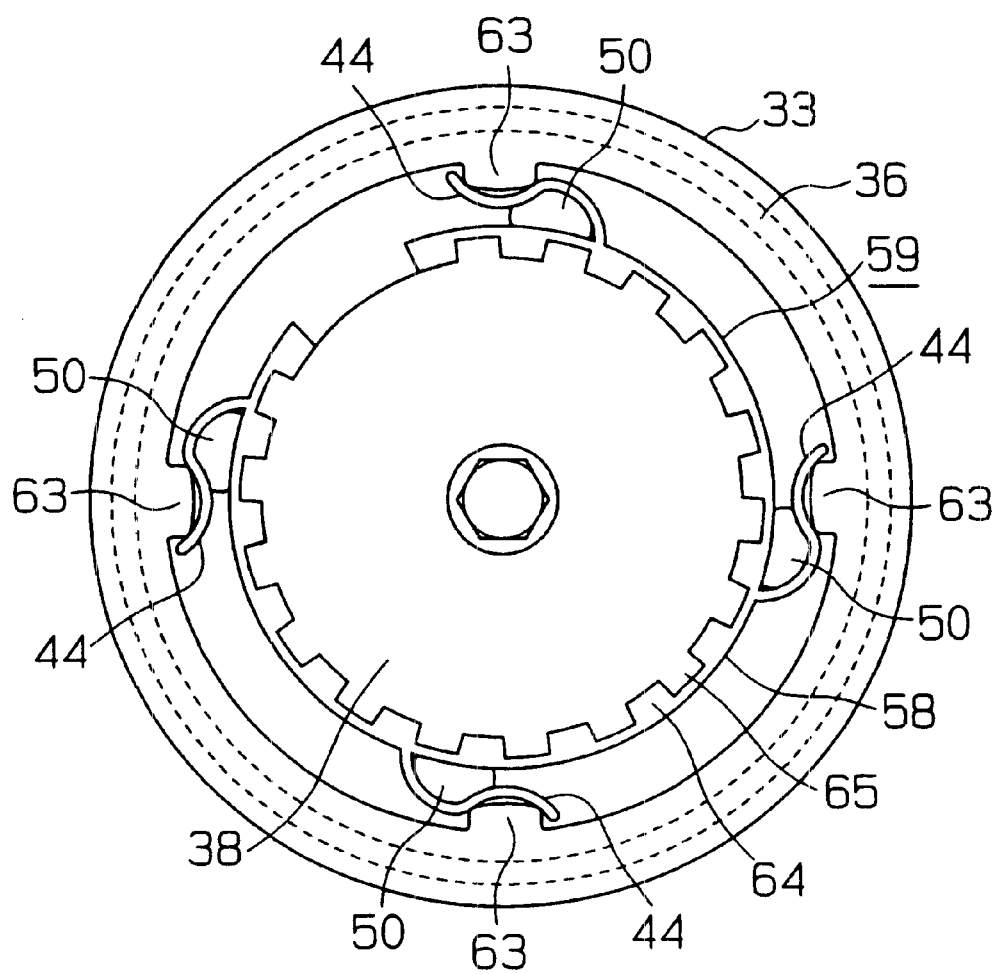
FIG. 12 is a front view illustrating a torque limiting mechanism according to a fifth embodiment of the present invention.

In a fifth embodiment shown in FIG. 12, the transmission springs 44 extend from a coupler member 59 that is attached to the hub 38. Coupler blocks 63 are formed on the pulley 33. The coupler member 59 is shaped like a ring with a part removed and has a single coupler spring 58. Each transmission spring 44 is engaged with the corresponding block 63. The coupler spring 58 and the hub 38 have inner teeth 64 and outer teeth 65, respectively. Each tooth 64, 65 has rectangular cross-section and extends radially. The inner teeth 64 and the outer teeth 65 are meshed with each other. When the relative rotation between the pulley 33 and the hub 38 is increased and the blocks 63 are disengaged from the transmission springs 44, the inner teeth 64 are disengaged from the outer teeth 65.

In the embodiment of FIGS. 1 to 7, the coupler springs 58 may have no elastic energy when the blocks 51 are disengaged from the hub 38 and contact the pulley 33 as shown in FIG. 7. That is, the coupler springs 58 need not press the blocks 51 against the pulley 33. Also, when the blocks 51 are disengaged from the hub 38, the blocks 51 need not rotate integrally with the pulley 33. That is, the ring 59 may be free without being integrated with either of the pulley 33 or the hub 38. As long as the blocks 51 are disengaged from the transmission springs 44 and from the grooves 41, the power transmission between the pulley 33 and the hub 38 is discontinued.

In the embodiment of FIGS. 1 to 7, the coupler blocks 51 are coupled to one another by the coupler springs 58. However, each coupler block 51 may be supported in a cantilever manner at the distal end of a leaf spring the proximal end of which is secured to the pulley 33.

Therefore, the present examples and embodiments are to be considered as illustrative and not restrictive and the invention is not to be limited to the details given herein, but may be modified within the scope and equivalence of the appended claims.

What is claimed is:

1. A torque limiting mechanism comprising:
   a first rotor that has an elastic member;
   a second rotor that has an engaging portion;
   a coupler member that is located between the rotors, wherein the coupler member is engaged with the elastic member and with the engaging portion such that power is transmitted between the rotors; and
   an urging member that urges the coupler member such that the coupler member is disengaged from the engaging portion, wherein, when power is transmitted between the rotors, the elastic member maintains the coupler member engaged with the elastic member and with the engaging portion, wherein, when load generated either in the first rotor or in the second rotor due to power transmission exceeding a predetermined level, the elastic member is elastically deformed such that the coupler member is disengaged from the elastic member, and wherein, when disengaged from the elastic member, the coupler member is disengaged from the engaging portion by the urging member.

2. The torque limiting mechanism according to claim 1, wherein, when the coupler member is disengaged from the engaging portion, the coupler member is integrated with the first rotor.

3. The torque limiting mechanism according to claim 2, wherein, after the coupler member is disengaged from the engaging portion, the urging member presses the coupler member against the first rotor such that the coupler member is integrated with the first rotor.

4. The torque limiting mechanism according to claim 1, wherein the elastic member comprises a leaf spring and has a pair of ends, and wherein at least one of the ends is fixed to the first rotor.

5. The torque limiting mechanism according to claim 1, wherein the coupler member is disengaged from the engaging portion by moving the coupler member in the radial direction.

6. A torque limiting mechanism for transmitting power from an external drive source to a drive shaft of a compressor, comprising:
   a pulley, wherein the pulley is rotatably supported by the compressor and is coupled to the external drive source;
   an elastic member attached to the pulley;
   a hub, wherein the hub is attached to the drive shaft and has an engaging portion;
   a coupler member located between the pulley and the hub, wherein the coupler member is engaged with the elastic member and with the engaging portion such that power is transmitted from the pulley to the hub; and
   an urging member that urges the coupler member such that the coupler member is disengaged from the engaging portion, wherein, when power is transmitted from the pulley to the hub, the elastic member maintains the coupler member engaged with the elastic member and with the engaging portion, wherein, when load generated in the compressor due to power transmission exceeds a predetermined level, the elastic member is deformed such that the coupler member is disengaged from the elastic member, and wherein, when disengaged from the elastic member, the coupler member is disengaged from the engaging portion.

7. The torque limiting mechanism according to claim 6, wherein, when disengaged from the engaging portion, the coupler member is integrated with the pulley.

8. The torque limiting mechanism according to claim 7, wherein, after the coupler member is disengaged from the engaging portion, the urging member presses the coupler member against the pulley such that the coupler member is integrated with the pulley.

9. The torque limiting mechanism according to claim 6, wherein the elastic member comprises a leaf spring and has a pair of ends, and wherein one of the ends is fixed to the pulley and the other end can be engaged with and disengaged from the coupler member.

10. The torque limiting mechanism according to claim 6, wherein the coupler member is disengaged from the engaging portion by moving the coupler member in the radial direction of the hub.

11. The torque limiting mechanism according to claim 9, wherein a damper is located between the elastic member and the pulley.

12. The torque limiting mechanism according to claim 11, wherein the damper is made of rubber.

13. A torque limiting mechanism for transmitting power from an external drive source to a drive shaft of a compressor, comprising:
   a pulley, wherein the pulley is rotatably supported by the compressor and is coupled to the external drive source;
   a plurality of elastic members attached to the pulley, wherein the elastic members are spaced apart by predetermined intervals;
   a hub, wherein the hub is attached to the drive shaft and has a plurality of engaging portions, the engaging portions corresponding to the elastic members;
   a plurality of coupler blocks located between the pulley and the hub, wherein each coupler block is engaged with one of the elastic members and with one of the engaging portions such that power is transmitted from the pulley to the hub; and
   a plurality of urging members, wherein the urging members urge the coupler blocks such that each coupler block is disengaged from the corresponding engaging portion, and wherein each urging member couples an adjacent pair of the coupler blocks, wherein, when power is transmitted from the pulley to the hub, each elastic member maintains the corresponding coupler block engaged with the corresponding elastic member and with the corresponding engaging portion, wherein, when load generated in the compressor due to power transmission exceeds a predetermined level, each elastic member is deformed such that the corresponding coupler block is disengaged from the corresponding elastic member, and wherein, when disengaged from the corresponding elastic member, each coupler block is disengaged from the corresponding engaging portion.

* * * * *